United States Patent [19]
Schmidt

[11] 3,799,037
[45] Mar. 26, 1974

[54] VALVE ATTACHMENT

[75] Inventor: Helmut Schmidt, Pforzheim, Germany

[73] Assignees: Helmut Schmidt, Pforzheim; Edwin H. Feitz, Bassum-Oster-Binde (Bremen), both of, Germany

[22] Filed: July 13, 1972

[21] Appl. No.: 271,402

[30] Foreign Application Priority Data
Mar. 14, 1972 Germany.............................. 2212130

[52] U.S. Cl................. 92/98 R, 73/146.8, 92/101, 137/227, 137/553
[51] Int. Cl........................... F01b 19/00, F16j 3/00
[58] Field of Search ..... 92/90, 96, 101, 98 R, 98 D; 137/227, 553; 73/146.8

[56] References Cited
UNITED STATES PATENTS

| 2,843,151 | 7/1958 | Greenawalt | 92/98 R X |
| 1,183,486 | 5/1916 | Pardue | 137/227 X |
| 1,436,000 | 11/1922 | Zimmerman | 137/227 |
| 2,225,675 | 12/1940 | West | 73/146.8 X |
| 2,836,671 | 5/1958 | Langstroth | 92/101 X |
| 2,842,087 | 7/1958 | Burns | 73/146.8 X |
| 2,948,256 | 8/1960 | Tapp | 73/146.8 X |
| 3,393,612 | 7/1968 | Gorgens et al | 92/101 |
| 3,230,968 | 1/1966 | Struby | 137/227 |
| 3,451,418 | 6/1969 | Nakagawa et al. | 137/227 |
| 3,536,026 | 10/1970 | Miller | 137/227 X |
| 3,592,218 | 7/1971 | Guy et al. | 73/146.8 X |

Primary Examiner—Edgar W. Geoghegan
Assistant Examiner—Abraham Hershkovitz

[57] ABSTRACT

The valve attachment is intended for use on a tubular valve holder and comprises tubular structure defining a prismatic cavity, a diaphragm sealing said prismatic cavity from one end of said tubular structure, means connecting said one end of said tubular structure to said valve holder and for subjecting said diaphragm through said valve holder to the pressure acting on said valve, a cap formed with a central opening and screwed on said tubular structure at the other end thereof, a plunger slidably guided in said cavity and provided with an extension at its end opposite to said diaphragm, and spring means urging said plunger into engagement with said diaphragm. Said diaphragm is adapted to move said extension through said opening in response to a predetermined pressure to which said diaphragm is subjected through said valve holder.

1 Claim, 1 Drawing Figure

PATENTED MAR 26 1974
3,799,037
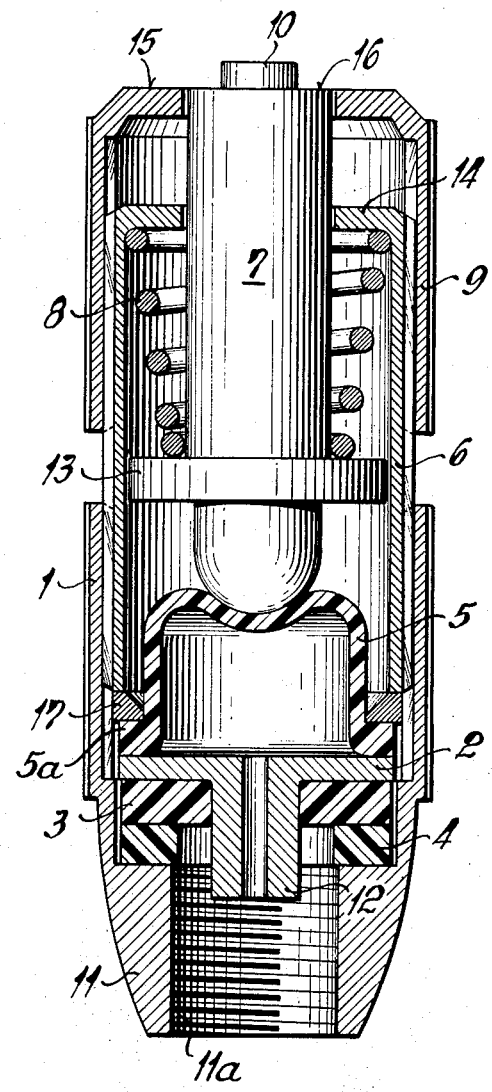

VALVE ATTACHMENT

This invention relates to a valve attachment for use on a tubular valve holder of a vehicle tire filled with compressed air.

It is an object of the invention to provide such a valve attachment which serves also as an instrument to indicate the pressure to which the tire is inflated.

That object is accomplished by the provision of a plunger, which is guided in a hollow prism and which by a diaphragm, which seals the compressed air outlet and is subjected to the air pressure in the tire against the action of a spring is slidably movable in a central bore of a cap that is screwed on the prism.

The valve attachment comprises a short tubular portion, which enters the valve holder as the valve attachment is screwed onto the valve holder. At the same time, the short tubular portion moves the valve member to its open position and permits the compressed air to act on the underside of the diaphragm. In dependence on the air pressure, the diaphragm is more or less deflected to force the plunger more or less out of the opening in the cap. The cap can be axially adjusted along the mating screw threads to such a position that the free surface of the plunger is flush with the adjacent surface of the cap when the tire is inflated to the correct value.

That arrangement enables a check whether the tire is inflated to a pressure that is too high or too low or correct, without need for applying a separate measuring instrument.

To enable such a check to be made also in the dark and at invisible locations, e.g., at twin tires, the free end face of the plunger according to the invention is provided with an extension which can be sensed by finger touch.

The drawing is a diagrammatic longitudinal sectional view showing by way of example a preferred embodiment of a valve attachment according to the invention.

The lower end portion 11 of the valve attachment generally is provided with screw threads 11a, which are threaded onto the tubular valve holder, not shown, until the top rim of the valve holder engages the seal 3. In that position, the end of the valve holder is surrounded by a sealing ring or sleeve 4. The short tubular portion 12 forces the valve member to its open position so that the air pressure in the tire can act through the tubular portion 12 on the underside of the diaphragm 5.

The diaphragm 5 is outwardly deflected to displace the plunger 7 in the cylindrical prism 6 against the action of the spring 8, which is held between a flange 13 and the top 14 of the cylindrical prism 6.

A cap 9 is screwed onto the cylindrical prism 6. The plunger 7 extends through the top 15 of the cap 9. The free end face 16 of the plunger 7 carries an extension 10 to be sensed by finger touch. The cylindrical prism 6 is screwed into the lower end portion of the valve attachment so as to force by means of a ring 17 the diaphragm flange 5a against the flange 2 of the tubular portion 12.

What is claimed is:
1. A valve attachment for use on a tubular valve holder, which valve attachment comprises
   a tubular structure defining a cylindrical prismatic cavity,
   a cup-shaped diaphragm sealing said cylindrical prismatic cavity from a short tubular portion at one end of said tubular structure,
   said short tubular portion connects said one end of said tubular structure to said valve holder whereby said diaphragm is subjected to predetermined pressure acting through said valve holder upon the engagement of said tubular portion with said valve holder to cause the transmission of said predetermined air pressure from within said valve holder into said valve attachment,
   a cap formed with a central opening and screwed on said tubular structure at the other end thereof,
   a plunger slidably guided in said cylindrical prismatic cavity and provided with an extension on its free end face, with a rounded surface at its other end, and with a plunger flange positioned near said other end,
   a spring positioned between the inside top surface of said cylindrical prismatic cavity and said plunger flange urging said rounded surface of the plunger into direct engagement with and for deformation of said diaphragm in the direction of the expansion of said spring whereby said air under predetermined pressure released thru the valve holder depresses said spring and moves said plunger in the direction of said free end face thereof, thereby positioning said plunger in response to said predetermined pressure,
   said cap being threadedly adjustable whereby the top of said cap can be aligned flush with said free end face of the plunger that has been positioned in response to said predetermined pressure,
   said valve attachment being responsive to changes in pressure from the predetermined pressure, whereby said top of the cap becomes out-of-flush with said free end face of the plunger, said cup-shaped diaphragm includes a diaphragm flange about the open circumferential end thereof,
   said short tubular portion has a flange about the circumferential end thereof opposite said tubular valve holder,
   said diaphragm flange and the flange of the tubular portion are in abutting engagement with each other between a ring and a seal,
   one surface of said ring is in abutting engagement with said diaphragm flange, the other surface thereof is in abutting engagement with the circumferential face end of said cylindrical prismatic cavity opposite said cap, and
   one surface of said seal is in abutting engagement with said flange of the tubular portion and the other surface is in abutting engagement with a sealing sleeve circumferentially surrounding a portion of said short tubular portion.

* * * * *

UNITED STATES PATENT OFFICE
CERTIFICATE OF CORRECTION

Patent No. 3,799,037    Dated September 30, 1974

Inventor(s) HELMUT SCHMIDT

It is certified that error appears in the above-identified patent and that said Letters Patent are hereby corrected as shown below:

Change name of the assignee Edwin H. Feitz to Erwin H. Fietz

Signed and sealed this 10th day of December 1974.

(SEAL)
Attest:

McCOY M. GIBSON JR.
Attesting Officer

C. MARSHALL DANN
Commissioner of Patents